(12) United States Patent
Varma et al.

(10) Patent No.: US 9,977,482 B2
(45) Date of Patent: May 22, 2018

(54) METHOD AND APPARATUS FOR SETTING AN I/O BANDWIDTH-BASED PROCESSOR FREQUENCY FLOOR

(75) Inventors: Ankush Varma, Hillsboro, OR (US);
Ian M. Steiner, Hillsboro, OR (US);
Krishnakanth V. Sistla, Beaverton, OR (US); Matthew M. Bace, Andover, MA (US); Vivek Garg, Folsom, CA (US); Martin T. Rowland, Beaverton, OR (US); Jeffrey S. Wilder, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 13/992,706

(22) PCT Filed: Dec. 21, 2011

(86) PCT No.: PCT/US2011/066488
§ 371 (c)(1),
(2), (4) Date: Jun. 7, 2013

(87) PCT Pub. No.: WO2013/095436
PCT Pub. Date: Jun. 27, 2013

(65) Prior Publication Data
US 2014/0129858 A1    May 8, 2014

(51) Int. Cl.
G06F 1/32       (2006.01)
G06F 13/38      (2006.01)

(52) U.S. Cl.
CPC .......... *G06F 1/324* (2013.01); *G06F 13/382* (2013.01)

(58) Field of Classification Search
None
See application file for complete search history.

(56) References Cited

U.S. PATENT DOCUMENTS 6,859,886 B1 *  2/2005  Johnson ................. 713/600
8,527,796 B2    9/2013  Werner
(Continued)

FOREIGN PATENT DOCUMENTS

CN      1973254 A       5/2007
KR      10-0498487      7/2005
(Continued)

OTHER PUBLICATIONS

PCT International Search Report for PCT Counterpart Application No. PCT/US2011/066488, 3 pgs., (dated Aug. 31, 2012).
(Continued)

*Primary Examiner* — Kim Huynh
*Assistant Examiner* — Joshua Neveln
(74) *Attorney, Agent, or Firm* — Nicholson De Vos Webster & Elliott LLP (57) ABSTRACT

An apparatus and method for managing a frequency of a computer processor. The apparatus includes a power control unit (PCU) to manage power in a computer processor. The PCU includes a data collection module to obtain transaction rate data from a plurality of communication ports in the computer processor and a frequency control logic module coupled to the data collection module, the frequency control logic to calculate a minimum processor interconnect frequency for the plurality of communication ports to handle traffic without significant added latency and to override the processor interconnect frequency to meet the calculated minimum processor interconnect frequency.

18 Claims, 4 Drawing Sheets

(56) References Cited

U.S. PATENT DOCUMENTS

| | | | |
|---|---|---|---|
| 2005/0262370 A1 | 11/2005 | Tsui et al. | |
| 2007/0288782 A1 | 12/2007 | Chang et al. | |
| 2010/0235672 A1* | 9/2010 | Zhang | G06F 1/12 713/400 |
| 2011/0145459 A1 | 6/2011 | Conti et al. | |
| 2012/0047390 A1* | 2/2012 | Hildebrand | 713/501 |
| 2012/0079290 A1* | 3/2012 | Kumar et al. | 713/300 |
| 2012/0198266 A1* | 8/2012 | Hofmann et al. | 713/501 |
| 2012/0324258 A1* | 12/2012 | Branover et al. | 713/320 |

FOREIGN PATENT DOCUMENTS

| | | |
|---|---|---|
| KR | 10-2011-0061401 | 6/2011 |
| WO | 03/021409 A2 | 3/2003 |
| WO | 03/027820 A2 | 4/2003 |
| WO | 2005/101163 A2 | 10/2005 |

OTHER PUBLICATIONS

PCT Written Opinion of the International Searching Authority for PCT Counterpart Application No. PCT/US2011/066488, 3 pgs., (dated Aug. 31, 2012).

PCT Notification concerning Transmittal of International Preliminary Report on Patentability (Chapter I of the Patent Cooperation Treaty) for PCT Counterpart Application No. PCT/US2011/066488, 5 pgs., (dated Jul. 3, 2014).

First Office Action from counterpart Chinese Patent Application No. 201180075685.0 dated Jan. 27, 2016, 22 pages.

\* cited by examiner

METHOD AND APPARATUS FOR SETTING AN I/O BANDWIDTH-BASED PROCESSOR FREQUENCY FLOOR

CROSS-REFERENCE TO RELATED APPLICATION

This patent application is a U.S. National Phase Application under 35 U.S.C. § 371 of International Application No. PCT/US2011/066488, filed Dec. 21, 2011, entitled METHOD AND APPARATUS FOR SETTING AN I/O BANDWIDTH-BASED PROCESSOR FREQUENCY FLOOR.

FIELD OF THE INVENTION

Embodiments of the invention relate to a computer system. Specifically, the embodiments of the invention relate to a method and system for managing the frequency of a processor interconnect to minimize latency for communication across the interconnect when the processor cores are idle.

DESCRIPTION OF THE RELATED ART

Computer processors can include multiple cores for executing instructions and a set of other components that enable the processing cores to efficiently execute instructions and to transfer data to other components of the computer system. The computer processors operate at a specific frequency or within a range of frequencies, which is determined by a clock signal within the processor. In many computer systems efficient power usage is an important consideration in the operation of the computer system. When the cores of the processor are not active (i.e., executing instructions) then the frequency of the processor clock can be reduced to conserve power, because the energy required for the computer processor to operate at a lower frequency is less than that required to operate at a high frequency.

In some computer systems there are multiple computer processors each with separate sets of cores for executing instructions. The computer processors can communicate with each other over a set of communication links such as a quick path interconnect (QPI), hypertransport or similar communication links. The QPI is described herein by way of example and not limitations. The computer processors also communicate with a set of memory devices and peripheral devices. Communication with the memory devices and peripheral devices can be through separate buses such as a Peripheral Component Interconnect Express (PCIe), as defined by the PCI Special Interest Group, bus for communicating with peripheral devices. These peripheral devices can also communicate with the memory devices in addition to each of the processors. The memory or peripheral devices can be connected to specific processors in a set of processors that are in communication with one another. The processors can be on the same main board or distributed over separate devices. The processors can access memory and peripheral devices primarily attached to the other processors. In cases where the processors or peripheral devices communicate with each other or the memory devices, the communication can traverse a processor that has a reduced frequency due to core inactivity. Communication across the processor operating at the reduced frequency is slowed because the reduced frequency affects the interconnect and communication ports of the processor.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
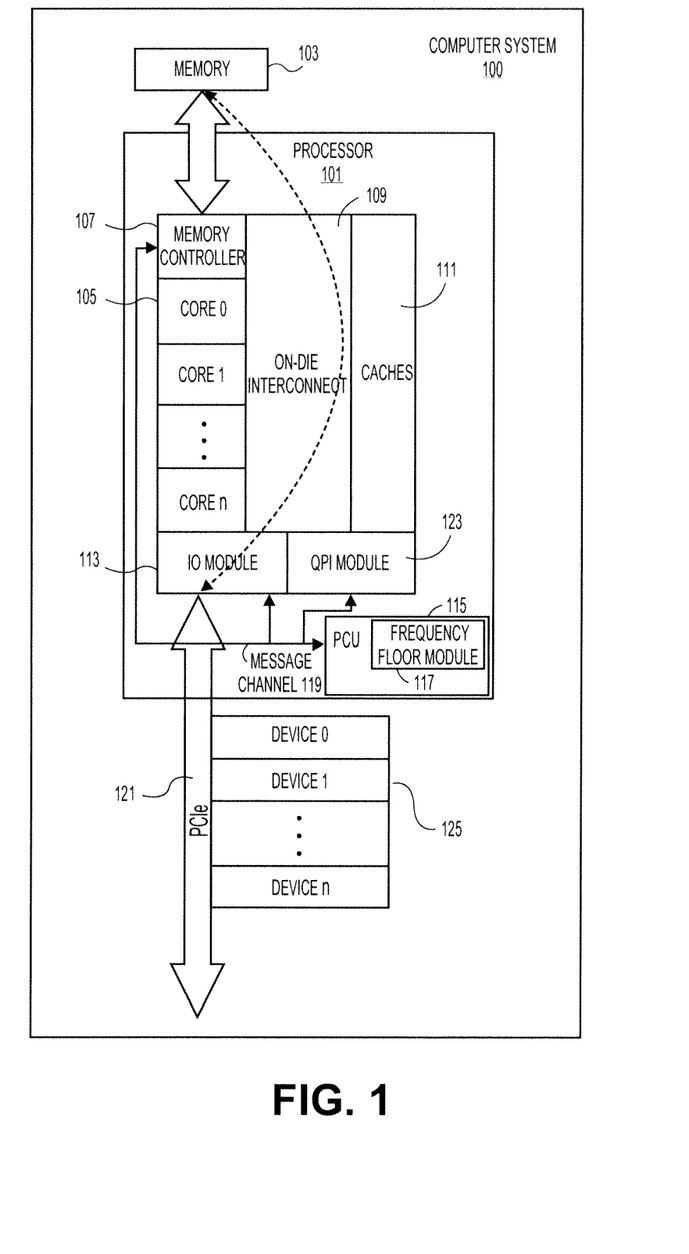
FIG. 1 is a diagram of one embodiment of a computer system with a single computer processor.

FIG. 1 is a diagram of one embodiment of computer system incorporating a power control unit that manages a minimum processor interconnect frequency. The computer system 100 includes a set of memory devices 103, a processor 101 and a set of peripheral devices 125 amongst other components of the computer system. A 'set,' as used herein refers to any positive whole number of items including one item. For sake of clarity, other conventional components of the computer system have been omitted to avoid obscuring the relevant aspects of the embodiments of the invention. One skilled in the art would understand that the computer system can encompass other components or more specific components than those described herein and that the principles and structures described in relation to the example illustrative embodiment would also apply to these other embodiments.

The memory devices 103 can be any type of dynamic or static random access memory (RAM) or similar storage devices for storing data and instructions at the direction of the processor 101 and the operating system executed by the processor 101. The memory devices 103 can include any number of memory devices and any size of memory devices. The memory devices 103 can be accessed by the processor 101 and other components can access the memory devices through the processor 101, specifically the interconnect 109 and communication ports of the processor 101.

The computer processor 101 can be any type of multi-core processor such as a dual-core or quad-core processor. The computer processor 101 can include a set of sub-components including a memory controller 107, a set of cores 105, an interconnect 109, caches 111, an I/O module 113, a QPI module 123, a power control unit 115 and similar sub-components. The cores 105 execute a set of instructions fetched from memory 103 or similar locations within the computer system 100. Any number of cores 105 can be present within the processor 101. These cores 105 can work separately or in coordination with one another as directed by an operating system to run applications and perform similar operations for a user of the computer system 100.

The memory controller 107 manages the communication between the processor 101 and the memory devices 103. The memory controller 107 can communicate with the memory devices 103 over a dedicated memory bus or a bus shared with other components of the computer system 100. The memory controller 107 can retrieve data stored in memory devices 103 and write data to memory devices 103 as directed by the processor 101. The memory controller can also facilitate retrieval of data from the memory devices 103 or writing of data to the memory devices on behalf of other computer system components. In either case, the cores or other components communicate with the memory controller 107 through the interconnect 109 of the processor 101.

The caches 111 of the processor 101 provide fast working memory for the cores 105 to use in executing instructions both to store instructions to be executed and also to store data being manipulated by the instructions and cores 105. The caches 111 can be shared by the cores 105 or can be controlled by specific cores 105. The caches 111 can have any size or organization. The caches 111 are accessed by the cores 105 over the interconnect 109. The memory module 107 and other communication ports can also write to or read from the caches 111.

In addition to the memory controller 107, the processor 101 can include additional communication ports to enable the processor 101 to exchange data with other processors and other components of the computer system 100. The additional communication ports can include a set of input/output modules 113, a QPI module 123 or similar inter-processor communication port or other types of communication ports. The I/O modules 113 can enable the processor 101 to exchange data with a set of peripheral devices 125. The set of peripheral devices 125 can communicate with the processor 101 over a bus 123 attached to the communication port 113. Any number of communication ports can be included in the processor 101 to separately or cooperatively communicate with the set of peripheral devices 125. In one example embodiment, the bus 123 is a Peripheral Component Interconnect Express (PCIe) bus.

The communication ports can also include communication ports for communicating with other processors that are local (i.e., within the computer system 100) or remote (i.e., external to the computer system 100). These communication ports 123 enable the processor 101 to exchange data with other processors as well as with memory or peripheral devices connected to these other processors. In one example embodiment, the communication port 123 is a quick path interconnect (QPI) module or similar protocol module. The processor 101 can support any number of communication ports for exchanging data with other processors.

In one embodiment, the processor 101 includes a power control unit (PCU) 115. The PCU manages the power configuration of the processor 101 and related components. The PCU 115 can operate independently or in combination with the operating system to manage power configuration for the processor 101 and related components. In one embodiment, the PCU 115 includes a frequency floor module 117. The frequency floor module 117 communicates with ports of the processor to monitor data traffic across the processor 101. Data traffic across the processor 101 can be driven by activity of the cores 105 or other components of the computer system 100 as well as components external to computer system 100. For example, the peripheral devices 125 can utilize memory devices 103 to store data and the data traffic between the peripheral devices 125 and the memory devices 103 passes through the processor 101 via the corresponding communication ports as well as the internal interconnect 109 of the processor 101.

One of the many aspects of power management controlled by the PCU 115 is the frequency or clock speed at which the processor 101 is running and executing instructions. The PCU 115 at the direction of the operating system may lower the frequency or clock speed of the processor 101 in response to the operating system entering a power saving mode such as a suspended state. The frequency or clock speed of the processor 101 can affect all of the components of the processor 101 including the communication ports and the processer interconnect 109. Data traversing the processor 101 is processed by the communication ports and the interconnect 109 at a rate established in relation to the processor frequency or clock speed. This can create a bottleneck at the processor 101 for data exchange between the peripheral devices 125 where the communication ports and the interconnect induce latency into the data exchange process above the normal timing of the processing of data across the processor 101. As a result, the performance of the computer system is adversely affected as the peripheral components 125 and other processors experience additional latency in exchanging data across the processor 101 when it is in a low power mode.

The frequency floor module 117 of the PCU 115 polls the communication ports over a message channel 119 or similar communication mechanism to obtain transaction data indicating the level of traffic flow through the communication ports. The frequency floor module 117 can override a processor frequency set by the PCU 115 based on input from the operating system or similar source to ensure a frequency that is sufficient to process the traffic of the communication ports. The process for determining the frequency floor is described herein below in additional detail. The process is described as setting a frequency for the processor 101 as a whole. However, one skilled in the art would understand that the principles and structures described herein are applicable to other embodiments where sub-components of the processor 101 have separate clocks. The term processor interconnect frequency is used herein to indicate the frequency of the processor as it affects the communication across the processor 101 between sub-components of the processor such as the communication ports as they use the internal processor interconnect 109.

The dotted-line in FIG. 1 is an illustration of an example transaction between an I/O module 113 servicing a peripheral 125 that is accessing memory device 103. The I/O module 113 receives a request and communicates with the memory controller 107 over the processor interconnect 109. The memory controller 107 communicates with the memory device 103 to retrieve or write the data as required by the peripheral device 125 and the memory device replies to the memory controller 107. The memory controller 107 returns the results of the data request back to the peripheral device through the I/O module 113.

Figure 2:
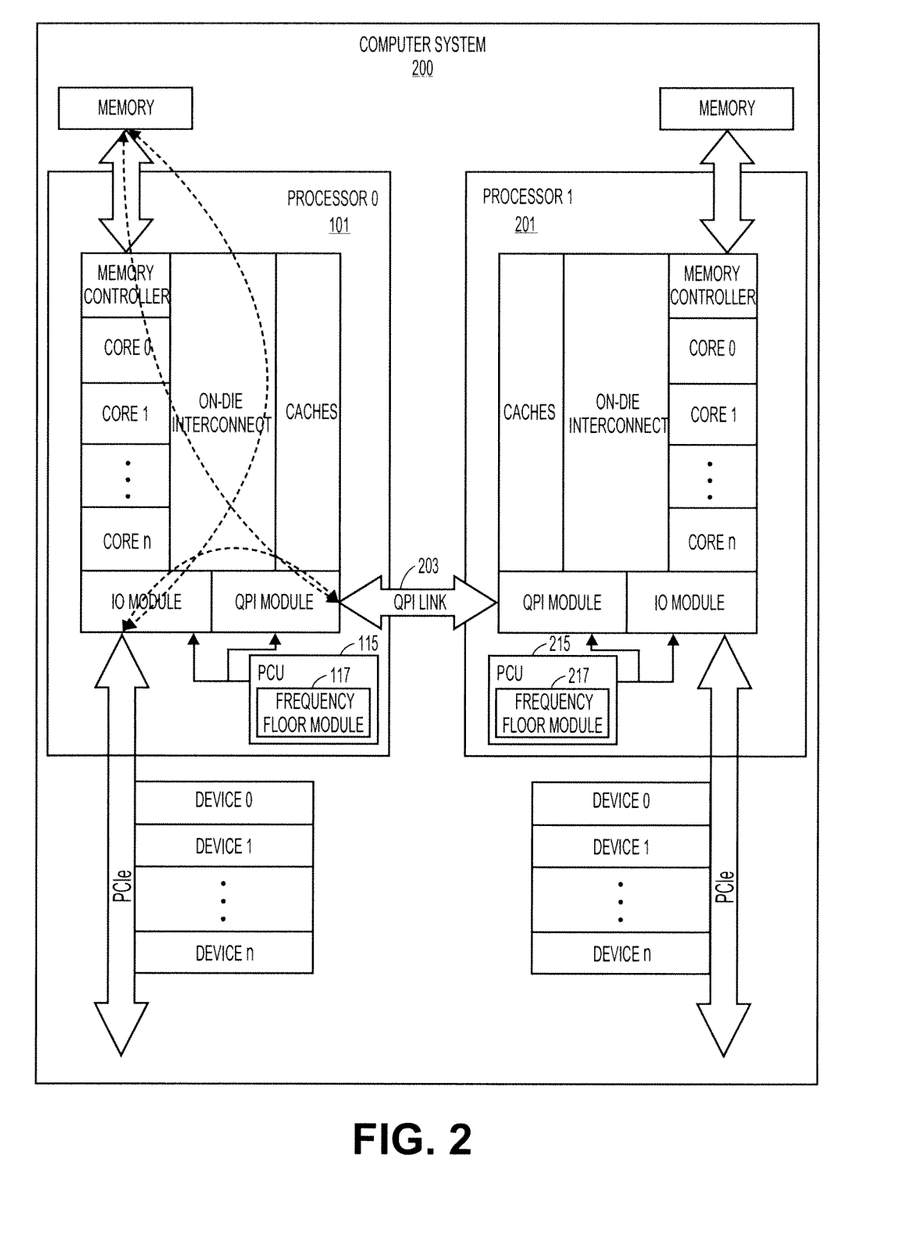
FIG. 2 is a diagram of one embodiment of a computer system with multiple computer processors.

FIG. 2 is a diagram of an example embodiment where the computer system is a multi-processor system each processor incorporating a power control unit that manages a minimum processor interconnect frequency. The components of the computer system 200 include a set of processors 101 and 201. The sub-components and related components of each processor 101, 201 are analogous to those described above in regard to the single processor system of FIG. 1. The second processor 201 has a separate set of memory devices, communication ports, peripheral devices and similar components. The processor 201 includes a PCU 215 and frequency floor module 217 that separately determine the frequency floor for processor 201.

The processor 201 can communicate with the processor 101 through a inter-processor communication link such as a QPI link 203. Each processor 101, 201 has a QPI module that manages the communication across the QPI link 203. Each processor 101, 201 can separately enter a low power state where the frequency of the processor is reduced. However, communication across the processors 101, 201 can still occur and this communication can be adversely affected by the low power state and low frequency of the processor.

An example set of data transactions are shown in FIG. 2 with dotted-lines. In this embodiment, in addition to communication across the processor 101 between the peripheral devices and the memory devices, communication across the processor 101 can occur between the other processor 201 and both the memory devices and the peripheral devices of the first processor 101. The same communication pattern is possible across the second processor 201. One skilled in the art would understand that the principles and structures described in relation to the example multi-processor computer system 200 can also be applied to other computer systems with any number of processors in communication with one another.

Figure 3:
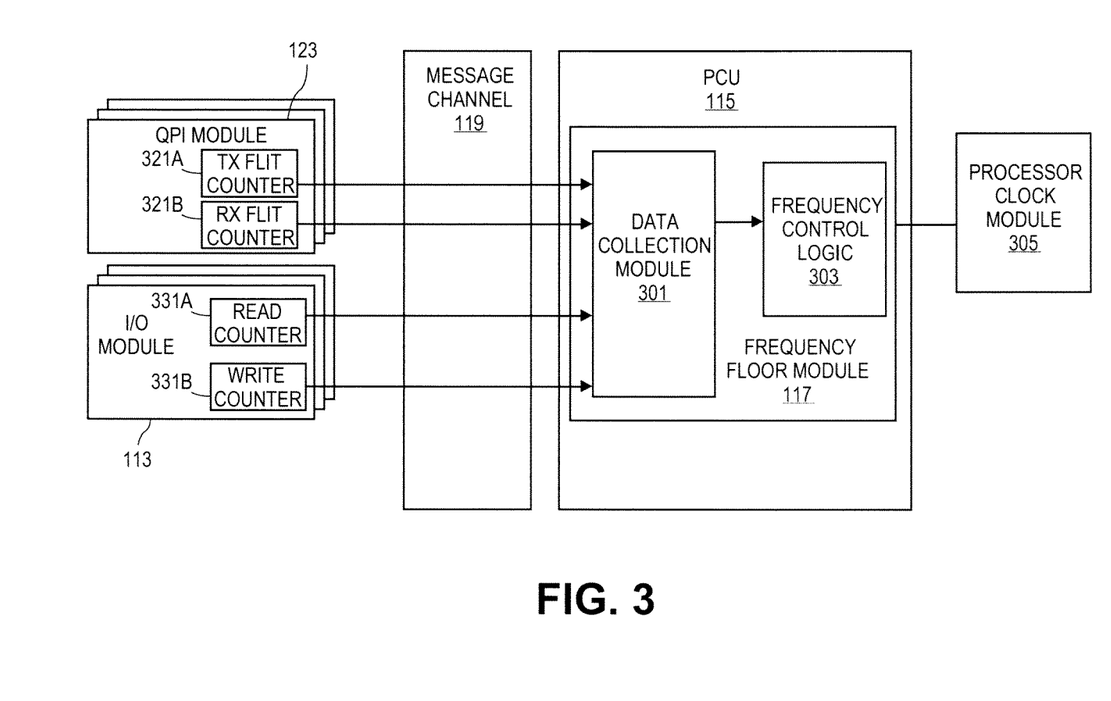
FIG. 3 is a diagram of one embodiment of a power control unit in a computer system.

FIG. 3 is a diagram of one embodiment of a power control unit implementing a frequency floor module. The PCU 115 includes a frequency floor module 117 and is in communication with a set of communication ports 113, 123 over a message channel 119 and a processor clock module 305. Each of the illustrated components is within a single processor. The other processor components have been omitted for sake of clarity for discussion of the PCU 115 and the relevant components in implementing the frequency floor module 117 and process.

The frequency floor module 117 includes a data collection module 301 and a frequency control logic module 303. The data collection module 301 communicates with the communication ports 123, 113 to obtain communication transaction rate data that can be used to determine a frequency floor for the processor that ensures data traffic across the processor is handled without significant added latency due to the low power or low frequency state of the processor caused by inactivity of the cores or for similar causes. The data collection module 301 can communicate with the communication ports over the message channel 119. The message channel is a specialized communication system within the processor that enables communication between processor sub-components outside of standard communication mechanisms such as the internal processor interconnect.

The data collection module 301 can obtain the communication transaction data from a set of counters in each of the communication ports 123, 113. The counters can include transmit and receive flit counters 321A, B in QPI modules 123. The counters can include read and write counters 331A,B in I/O modules 113. In one embodiment, the data collection module 301 can obtain the counter data every 1 ms using a message channel 'bulk read' operation, which samples all counter values simultaneously to avoid any timing skew between the readouts. The I/O module counters 331A,B and QPI module counters 321A,B can be sized to avoid rollover by having rollover intervals greater than 2 ms to account for any jitter between read cycles.

The data collected from the counters by the data collection module 301 can then be processed by the frequency control logic module 303. The counters can be normalized for comparison depending on the metrics utilized in each counter. In one example embodiment, the I/O module counters 331A,B can be used in the format in which they are presented. The QPI module counters 321 A,B may be summed into a single value per QPI module 123 for each QPI link. The maximum of these per link values can then be utilized, i.e. QPI value=MAX (QPI_Counter[0], QPI_Counter[1]).

In one embodiment, the counter values can be compared with threshold values stored in a lookup table or similar storage device. In another embodiment, the counter values can be processed with a formula to compute the minimum processor interconnect frequency (i.e., the frequency floor) that is sufficient to sustain the traffic at the corresponding communication port. This formula could be represented by FMIN=A+MAX(B*IO_Counter, C*QPI_Counter), where A, B and C are programmable constants.

In some embodiments, when there are multiples of a communication port types in a processor the maximum of these individual communication port frequency floors is taken as the processor interconnect frequency that will be the frequency floor for the processor. In other embodiments, if the communication ports generate traffic flows across the processor that have an additive bandwidth characteristic where each communication port bandwidth is cumulative with other communication port bandwidth, the summed bandwidth or data traffic rate metric should be used in calculating the frequency floor using the formula or threshold lookup table.

The frequency control logic module 303 can also interact with the processor clock module 305 or similar processor component to adjust the current frequency of the processor to the frequency floor determined by the frequency floor module 117. In other embodiments, the frequency floor module 117 manages multiple or independent clocks within the processor to ensure the frequency floor is maintained for the communication ports and internal processor interconnect to avoid added latency for data traffic handling across the processor. Other processor or computer system components as well as the operating system can have visibility on the frequency floor set by the PCU and the frequency floor can be overridden by these other components as determined by administrator or manufacturer configuration. For example, the processor can override the frequency floor minimum in response to changes in thermal or power conditions within the computer system.

Figure 4:
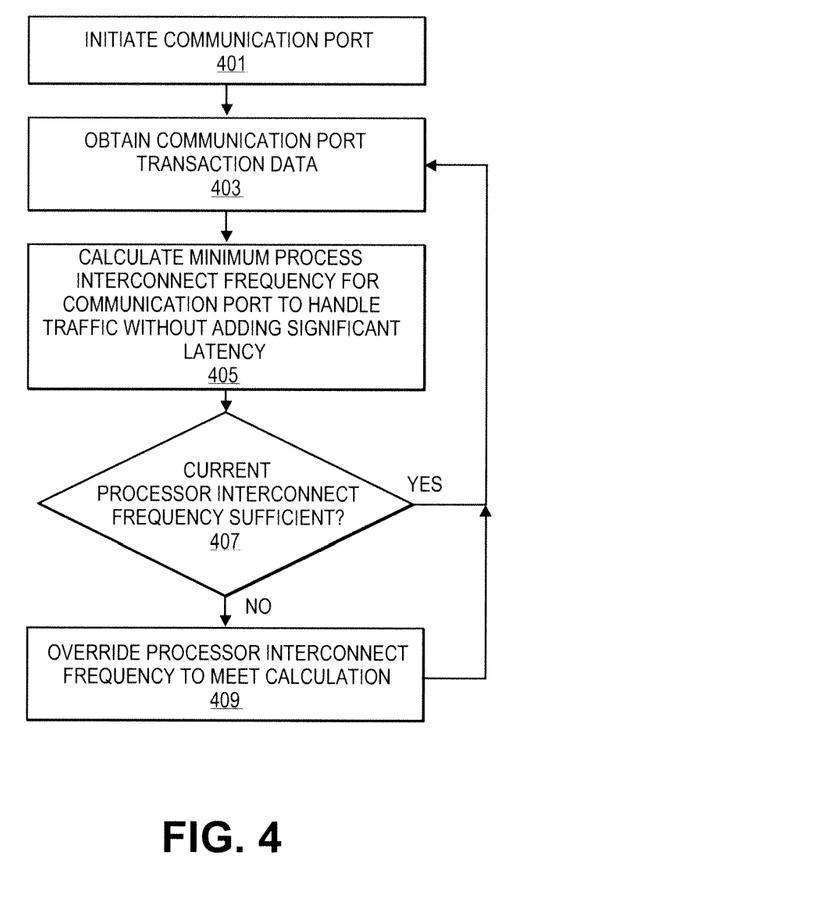
FIG. 4 is a flowchart of one embodiment of a process of a power control unit to manage a minimum processor interconnect frequency.

FIG. 4 is a diagram of one embodiment of a process for frequency floor management. In one embodiment, the process is initiated by the frequency floor module of a PCU in response to the processor entering a low power state or other energy saving state that would affect the data traffic across the processor. In response to these conditions or an input from an external source, the frequency floor monitoring process is initiated (Block 401). The process can continue by the frequency floor module obtaining the communication port data transaction data from the communication ports (Block 403). This data can be obtained by polling the communication ports to obtain counter data maintained by each port. In one embodiment, the data can be obtained by a bulk read operation over a message channel of the processor. The counter values are returned to the frequency floor module for further processing.

The counter values are used to calculate a minimum processor interconnect frequency for all communication ports to handle their respective traffic without significant additional latency (Block 405). The low power state of the processor can slow the transmission and processing of this data relative to the full power or top frequency setting. The minimum processor interconnect frequency is calculated to ensure that no latency is added relative to this baseline, but the full power or top frequency won't have to be utilized allowing energy savings. This improves overall performance especially during low core activity and high I/O scenarios. The increase in power consumption for the frequency floor is offset by avoiding I/O and similar communication port activity to take a disproportionately long time to complete, which lowers the overall energy efficiency of the processor. The frequency floor can have a net improvement in energy efficiency as a result. The minimum processor interconnect frequency can be calculated using the formulas discussed herein above or through the use of a threshold level lookup.

A check is made to determine whether the minimum processor interconnect frequency that has been calculated is exceeded by the current processor frequency (Block 407). If the processor currently exceeds the minimum processor interconnect frequency then the process continues at defined intervals (e.g., 1 ms) to obtain updated communication port transaction data (Block 403). If the processor does not currently exceed the minimum processor interconnect frequency, then the frequency floor module can override the processor settings for the frequency to meet the calculated minimum processor interconnect frequency (Block 409). The process can then continue by obtaining updated communication port transaction data (Block 403).

The embodiments thereby provide an effective countermeasure that detects the occurrence of processor bottleneck scenarios by responding in a graduated process dependent on the level of data traffic across the processor. The process thereby improves bandwidth usage and lowers latency in scenarios where I/O or a remote processor is active, while maintaining power efficiency.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
a power control unit to manage power in a computer processor, the power control unit including:
a data collection module to obtain transaction rate data from a plurality of communication ports in the computer processor, wherein the plurality of communication ports include input/output modules and processor interconnect modules, wherein
the transaction rate data is provided by a set of counters in each communication port, wherein the counters are for transmit and receive for the processor interconnect modules and the counters are for read and write for the input/output modules; and
a frequency control logic module coupled to the data collection module, the frequency control logic module to
calculate a minimum processor interconnect frequency for the computer processor based on the transaction rate data obtained from the plurality of communication ports, the minimum processor interconnect frequency enabling the communication ports to handle traffic without significant added latency due to a low power or low frequency state of the computer processor caused by inactivity of cores of the computer processor; and
override a processor interconnect frequency to meet the calculated minimum processor interconnect frequency.

2. The apparatus of claim 1, wherein the frequency control logic module sets a system clock to the calculated minimum processor interconnect frequency.

3. The apparatus of claim 1, wherein the data collection module polls the plurality of communication modules to obtain the transaction data.

4. The apparatus of claim 1, wherein the frequency control logic module compares a maximum transaction rate of the plurality of communication ports to a threshold value to determine whether to override the processor frequency.

5. The apparatus of claim 1, wherein the frequency control logic module calculates the minimum processor interconnect frequency as a maximum of a set of processor interconnect frequency floors for the plurality of communication ports.

6. The apparatus of claim 1, wherein the data collection module polls the plurality of communication ports at regular intervals over message channel as a bulk read.

7. The apparatus of claim 1, wherein the minimum processor interconnect frequency is calculated as A+MAX (B*input/output module counter values, C* processor interconnect module counter values), where A, B and C are programmable constants.

8. A computer system comprising:
a memory device to store data;
a first multi-core processor to perform a first set of programmed operations; and
a second multi-core processor coupled to the memory and first multi-core processor to perform a second set of programmed operations, the second multi-core processor including a power control unit to manage power in a computer processor including:
a data collection module to obtain transaction rate data from a plurality of communication ports in the second multi-core processor wherein the plurality of communication ports include input/output modules and processor interconnect modules, wherein
the transaction rate data is provided by a set of counters in each communication port, wherein the counters are for transmit and receive for the processor interconnect modules and the counters are for read and write for the input/output modules, and
a frequency control logic module coupled to the data collection module, the frequency control logic module to
calculate a minimum processor interconnect frequency for the computer processor based on the transaction rate data obtained from the plurality of communication ports, the minimum processor interconnect frequency enables the communication ports to handle traffic without significant added latency due to a low power or low frequency state of the computer processor caused by inactivity of cores of the computer processor; and override a processor interconnect frequency to meet the calculated minimum processor interconnect frequency.

9. The computer system of claim 8, wherein the frequency control logic module sets a system clock to the calculated minimum processor interconnect frequency.

10. The computer system of claim 8, wherein the data collection module polls the plurality of communication modules to obtain the transaction data.

11. The computer system of claim 8, wherein the frequency control logic module compares a maximum transaction rate of the plurality of communication ports to a threshold value to determine whether to override the processor frequency.

12. The computer system of claim 8, wherein the frequency control logic module calculates the minimum processor interconnect frequency as a maximum of a set of processor interconnect frequency floors for the plurality of communication ports.

13. The computer system of claim 8, wherein the data collection module polls the plurality of communication ports at regular intervals over message channel as a bulk read.

14. A method comprising:
  initiating monitoring of a communication port by a power control unit (PCU) wherein the communication port is one of an input/output module and a processor interconnect module;
  obtaining communication port transaction data from the communication port, wherein the communication transaction rate data is provided by a set of counters in the communication port, wherein the counters are for transmit and receive for the processor interconnect module and the counters are for read and write for the input/output module;
  calculating a minimum processor interconnect frequency for a processor on a die-shared by the PCU, the minimum processor interconnect frequency enabling the communication port to handle traffic without significant added latency due to a low power or low frequency state of the processor caused by inactivity of cores of the processor; and
  overriding a processor interconnect frequency to meet the calculated minimum processor interconnect frequency.

15. The method of claim 14, further comprising:
  checking whether the processor frequency meets the minimum processor interconnect frequency.

16. The method of claim 14, further comprising:
  setting a system clock to the minimum processor interconnect frequency.

17. The method of claim 14, further comprising:
  polling the communication port to obtain the communication port transaction data.

18. The method of claim 14, further comprising:
  comparing a maximum transaction rate of a plurality of communication ports to a threshold value to determine whether to override the processor frequency.

* * * * *